United States Patent [19]

Riganati et al.

[11] 4,156,230

[45] May 22, 1979

[54] METHOD AND APPARATUS FOR AUTOMATIC EXTRACTION OF FINGERPRINT CORES AND TRI-RADII

[75] Inventors: John P. Riganati, Yorba Linda; Richard D. Capello, Orange; Gerald D. Brown, Mission Viejo; Norman L. Bolton, Riverside; Alexander Csiszer, Orange, all of Calif.

[73] Assignee: Rockwell International Corporation, El Segundo, Calif.

[21] Appl. No.: 847,987

[22] Filed: Nov. 2, 1977

[51] Int. Cl.² ............................................. G06K 9/00
[52] U.S. Cl. ............................................. 340/146.3 E
[58] Field of Search ............... 340/146.3 E, 146.3 Q, 340/146.3 AE; 364/819, 820, 822

[56] References Cited

U.S. PATENT DOCUMENTS

| | | | |
|---|---|---|---|
| 3,492,646 | 1/1970 | Bene et al. | 340/146.3 Q |
| 3,699,519 | 10/1972 | Campbell | 340/146.3 E |
| 3,863,218 | 1/1975 | Oka et al. | 340/146.3 AE |
| 3,899,771 | 8/1975 | Saraga et al. | 340/146.3 AE |
| 3,979,722 | 9/1976 | Sakoe | 340/146.3 AE |

OTHER PUBLICATIONS

Ting, "Detection of the Core and Delta of Fingerprints", IBM Tech. Disclosure Bulletin, vol. 17, No. 2, Jul., 1974, pp. 406-407.

Primary Examiner—Leo H. Boudreau
Attorney, Agent, or Firm—L. Lee Humphries; H. Fredrick Hamann; Rolf M. Pitts

[57] ABSTRACT

A method and apparatus for the smoothing and singularity detection of the ridge contour data of a fingerprint image for classification in an automatic fingerprint identification system. A template scanning window is passed electronically over a digital matrix of ridge contour data to generate a set of correlation values corresponding to each contour data element and to a plurality of reference angle vectors. The correlation values are processed for determination of peaks and valleys. Tests are conducted to determine whether the relative values of peaks and valleys and the relative spacing between peaks and valleys satisfy certain threshold criteria for reliable extraction of fingerprint singularity points for classification. The resultant data, representing the number of correlation peaks and the direction of each, defines the location and angular orientation of cores and deltas of a fingerprint.

17 Claims, 17 Drawing Figures

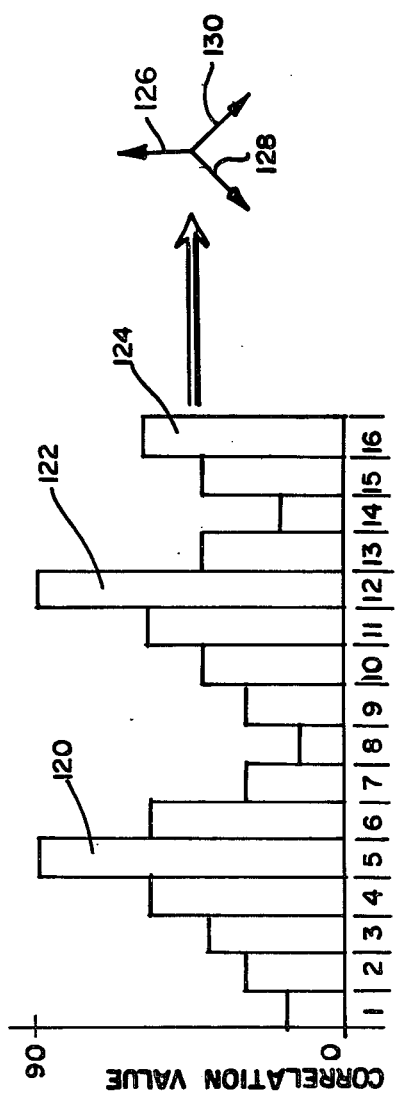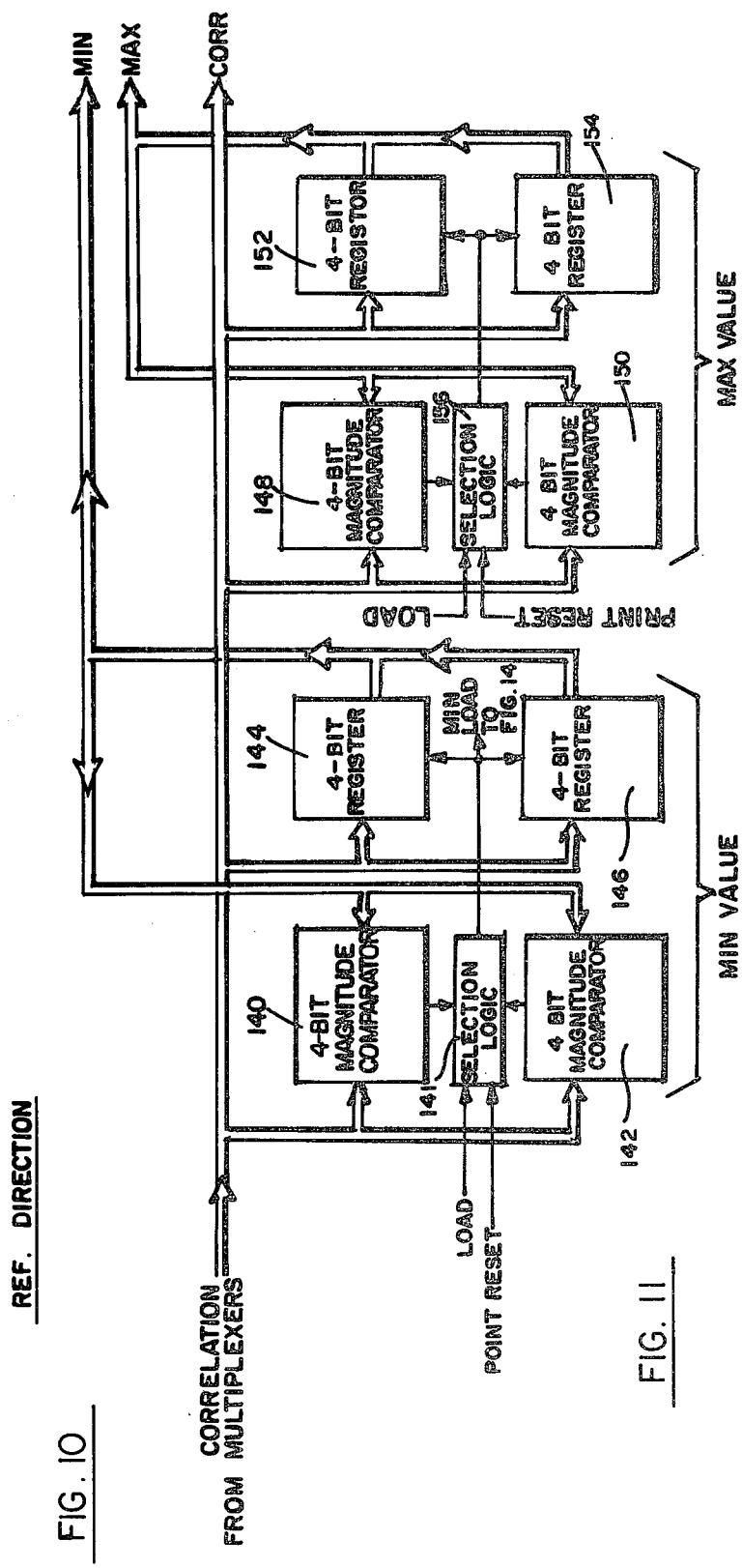
FIG. 10
FIG. 11

METHOD AND APPARATUS FOR AUTOMATIC EXTRACTION OF FINGERPRINT CORES AND TRI-RADII

The invention herein was made in the course of or under a contract or sub-contract with the U.S. Government.

FIELD OF THE INVENTION

This invention relates generally to the classification of fingerprints in an automatic fingerprint identification system. More specifically this invention relates to a determination of the location and angular orientation of singularity points for automatic fingerprint classification.

BACKGROUND OF THE INVENTION

Despite the proven importance of fingerprint identification in the fight against crime, nearly all such identification still relies on the Henry system, a manual system for classification and comparison of fingerprints which originated around the turn of the century. Numerous law enforcement agencies throughout the world are in the process of converting from such overburdened manual fingerprint identification and matching systems to high-speed computer based automatic systems.

Automatic fingerprint identification systems, such as the system disclosed in commonly assigned patent application Ser. No. 722,244, filed Sept. 10, 1976, employ fingerprint minutiae based identification and matching wherein data, based upon the location of ridge endings and bifercations, are used to compare an unidentified fingerprint with a library of previously identified fingerprints. However, the fingerprint data base that must be stored to accommodate the accumulated records is so voluminous that even with high-speed electronic circuits, automatic systems that rely solely on minutiae data matching are still not efficient. Accordingly, a reliable classification process has been developed that is conducive to electronic data manipulation and that substantially reduces the data base for each minutiae based matching process.

The function of this automatic classification process is to repeatably and consistently classify individual fingerprints into principal classes which may be described as arch-like, whorl-like and loop-like and to further subdivide each of these classes into subordinate classes which are still relatively insensitive to the normal variations that occur in the process of recording fingerprints.

The present invention is a method and apparatus for performing an important aspect of reliable classification, namely the determination of the location and angular orientation of core and delta singularities. A preferred embodiment of the subject invention is used in achieving highly reliable classification of fingerprint patterns by means of a novel combination of process steps which may be generally characterized in the following manner:

1. Generating an array of quantized ridge contour data from a fingerprint image.
2. Detecting and extracting characteristic singularities and producing a smooth regional contour array from the ridge contour data.
3. Mapping elements of the smooth regional contour array into descriptors which relate to the curvatures and singularities defined by the countour array.
4. Defining a pattern area over which detailed pattern analysis is performed.
5. Identifying sets of contiguous identical descriptors constituting significant regions of curvature and determining size and position information associated with each such region.
6. Performing primary classification to canonical classes.
7. Measuring core-delta distance.
8. Performing subordinate classification of loops and whorls utilizing core-delta distance data.

Cores and deltas, or tri-radii, collectively referred to as singularities, are fundamental elements of the characterization of fingerprints. It is desirable to smooth or filter variations in the ridge contour data caused by a wide variety of noise sources. This smoothing function, which in turn allows the reliable extraction of the location and angular directions of the singularities, is performed by the subject invention, denoted hereinafter as the ANGFLOW circuit.

The ANGFLOW circuit is the foundation of the automatic classifier. It is a two-dimensional filter which quantizes the ridge contour angles into a smaller number of reference directions while at the same time coding regional contour flow in a fixed neighborhood of each contour element into a single new element of data. The ridge contour array may be viewed as a unit amplitude vector field. A two-dimensional smoothing filter examines the correlations which exist in a 5×5 window about each contour angle between each of sixteen reference directions and the average ridge flow in that direction. Thus, each ridge contour angle is replaced by an element of a 1, 2, or 3 vector field.

Each element of the new vector field indicates up to three directions which are supported by the surrounding 5×5 region. As a result of the procedure of converting to such a vector field, the invention produces one-vector elements in the vicinity of a core or core-like region and three-vector elements in the vicinity of a delta or tri-radial region. The non-singularity regions produce two vectors, not usually 180° apart, which are eventually employed to produce the regional curvature descriptors for use in pattern analysis. The two directions indicate the direction of the surrounding flow. In a region where the flow is straight (uncurved), the elements are 180° apart.

A circular region produces no vectors because no radial directions support flow outward from the center of such a region. Because the 5×5 scanning window is used to measure correlations at every ridge contour element, there is an overlap and a resulting generation of clusters of delta and core singularities. The specific points of core and delta singularities are taken at the geometric centroid of the respective clusters. These clusters describe the important fingerprint characteristics used in the classification process. An important structure of a fingerprint for classification is the position and amount of curvature. A whorl has significant recurve on both sides of the core while a loop has a recurve on only one side of the core and an arch has no recurve. It has been found convenient to group similar curves together and identify them by mnemonic letter or symbol.

These symbols fall into categories which provide a local description of the immediate area in which they occur, and when grouped together in clusters also provide a more global description of the fingerprint. A global description of the fingerprint is achieved by examining the relationship of clusters of different descriptors. Examination of the descriptors and their significance leads to construction of canonical forms for each of the main classes of fingerprint classification, namely, arch, tented arch, right loop, left loop, plain whorl, central pocket loop and double loop. Using these canonical forms as models, the classification process examines the regional descriptors for each fingerprint and makes a determination of whether the current print is a reasonable permutation of a canonical form. If the distortion is sufficiently gross to prevent a decision the print is rejected.

The key to reliability of the fingerprint classification process is an accurate determination of the nature and location of singularity points. This accuracy has been achieved in the current invention by means of a unique process involving reference angle correlation to determine the general ridge flow at each point and by a correlation data processing system which determines the number and direction of the correlation peaks. Correlation data processing is accomplished in accordance with a set of restrictive tests which insure a more reliable and accurate evaluation of correlation peaks. The result is a classification system for automatic fingerprint identification which is more reliable and more accurate than all other known prior art classification systems.

A BRIEF DESCRIPTION OF THE DRAWINGS

FIG. 1 is a general block diagram of a fingerprint identification system including classification.

FIGS. 2A, 2B, 2C, and 2D, herinafter referred to as FIG. 2, provide an illustration of various classification types.

FIG. 10 is a graph-like representation of the output data of the correlation logic circuits and the corresponding output data of the correlation-peak processing portion of the invention.

FIG. 11 through FIG. 14 are logic block diagrams of the correlation-peak processing portion of the invention.

DESCRIPTION OF A PREFERRED EMBODIMENT

Figure 1:
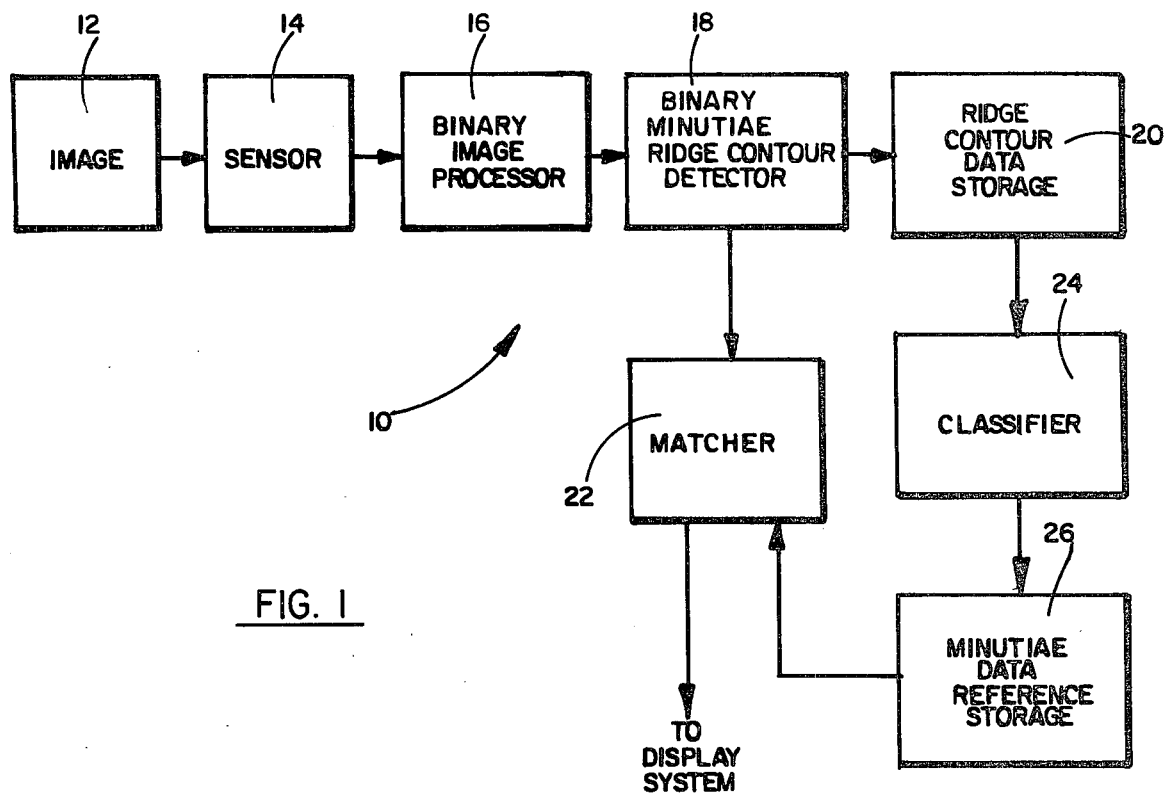
Figure 2A:
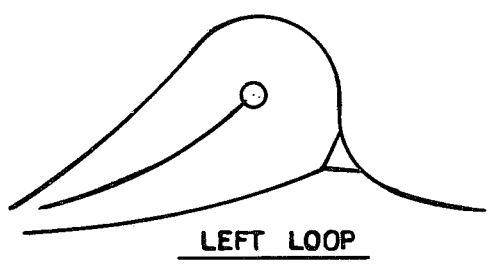
Figure 2B:
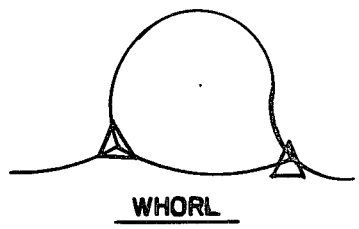
Figure 2C:
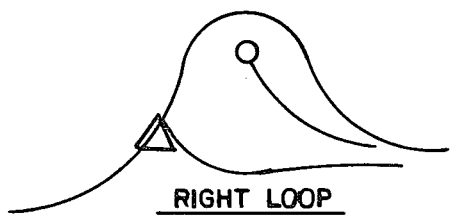
Figure 2D:
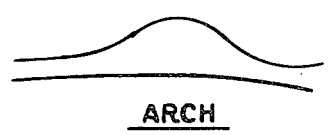

Referring now to FIG. 1 there is shown therein a block diagram of a fingerprint identification system 10 and including image means 12, sensor 14, binary image processor 16, binary image minutiae and ridge contour detector 18, ridge contour data storage device 20, fingerprint matcher 22, classifier 24 and minutiae data reference storage device 26.

Image means 12 may be any suitable means for applying a fingerprint image, such as, a fingerprint photograph, videofile, or an actual human finger. The image is applied to a suitable sensor which transforms the optical information contained in the fingerprint into a suitable electrical representation of the image. The resulting electrical signals are then converted to binary form. This is accomplished by means of binary image processor 16. Accordingly, the output signal of binary image processor 16 is a binary data representation of the original image applied to sensor 14. The binary output signal is applied to a binary image minutiae and ridge contour detector which is appropriately designed to detect fingerprint minutiae consisting of ridge endings and ridge bifurcations and the general contour or shape of fingerprint ridges.

The ridge contour data detected by binary image minutiae and ridge contour detector 18 is applied to a ridge contour data storage device 20 while the minutiae data generated at the output of detector 18 is applied to matcher 22. Ridge contour data storage device 20 also generates output signals which are applied to classifier 24. A minutiae data reference storage device 26, which has been previously programmed to store a data base of fingerprint data against which the incoming fingerprint image data is compared to determine whether or not a match exists, is available to generate minutiae data signals to be applied to the matcher where the comparison between the incoming data and the stored data takes place.

The matching process, which typically relies upon a comparison of the geometrical characteristics of ridge endings and ridge bifurcations of the fingerprint image and the corresponding data stored in storage device 26, would ordinarily compare each of the stored fingerprint images with the image presently being applied to the system. However, as previously discussed, for very large data bases this process would be inordinately time consuming and render the system relatively inefficient despite its automatic operation. Accordingly, classifier 24 analyzes the ridge contour data stored in storage device 20 to determine which of several principal and subordinate classes the current image corresponds to so that the data stored in reference storage device 26 may be divided up according to such principal and subordinate classes and only the appropriate portion of the data base is searched to seek a match for the incoming image.

FIG. 2 illustrates simplified examples of pattern classification types, wherein the left loop and the right loop are distinguished according to their flow with respect to a single tri-radii point marked with a delta and a core point marked with a circle. A whorl is also shown and is identified by the existence of two tri-radii points. An arch is shown which is defined as a pattern having no tri-radii points. From the examples of classification types illustrated in FIG. 2 it will be evident that singularity points, that is, cores and deltas of a fingerprint pattern, their location and direction, are important indicia of the classification type in which a fingerprint image falls.

Figure 3:
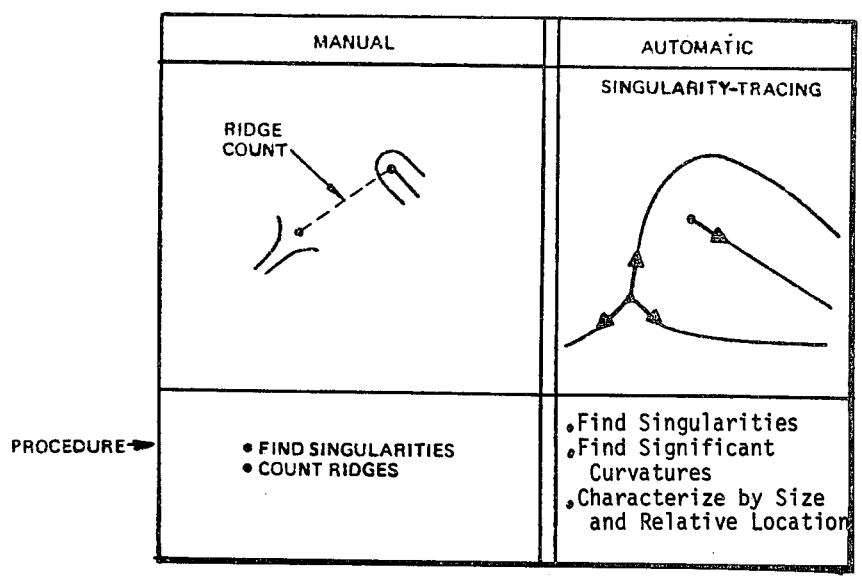
FIG. 3 is an illustration used to compare the procedures of manual and automatic fingerprint classification.

As shown in FIG. 3, in the manual classification process the classification depends upon the ridge count, that is, the number of ridges intervening between the delta and the core of the fingerprint image. Accordingly, the procedure followed in manual classification first requires that the singularities, that is, the deltas and cores be located and then the ridges intervening between these singularities be counted. The corresponding procedure in the automatic classification concept, illustrated on the right side of FIG. 3, indicates that like the manual classification system the singularities must first be determined. However, unlike the manual system, which relies to a great extent upon the complex reasoning and perception of the human mind, the automatic system traces the singularities as shown and then characterizes the fingerprint class by the size and location of significant curvatures. Accordingly, the automatic classification system depends upon knowledge of the location and direction of the ridge flow at the point of the singularities. The vector elements previously mentioned with respect to the singularities must be determined. That is a critical aspect of this invention, namely, that the number of the correlation peaks and the direction of the reference angle corresponding to each such peak be determined.

Figure 4:
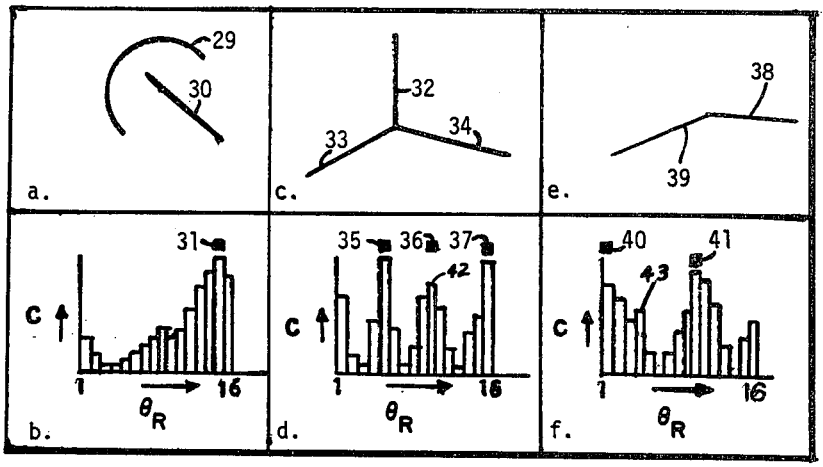
FIG. 4 is a graph-like illustration used to explain the correlation feature of the invention.

FIG. 4 illustrates the relationship between the ridge contour flow at a fingerprint data point and the corresponding correlation data plotted against sixteen reference angles as explained below. As shown in FIG. 4a, a ridge 30 terminating in a ridge recurve flow 29 which corresponds to a core singularity, results in the generation of a single peal 31 in the correlation graph as shown in the corresponding FIG. 4b. Similarly, a delta singularity of a fingerprint, may be characterized by a three-vector element comprising vectors 32, 33 and 34 as shown in FIG. 4c. Generally, a corresponding correlation graph is characterized by three correlation peaks, namely peaks 35, 36 and 37, that is, there are three directions of average ridge flow stemming from a tri-radial singularity. Each such direction creates a correlation peak with a corresponding reference angle of a 5×5 scanning window. This will be explained in more detail below. Finally, FIG. 4e illustrates the relationship between a two-vector element comprising vectors 38 and 39 and the corresponding two-peak correlation graph shown in FIG. 4f having the peaks 40 and 41.

Of course, it will be understood that FIG. 4 represents an ideal noise-free representation of the vector elements and their corresponding correlation graphs. In a real system under high speed and noisy operating conditions resulting from the nature of the fingerprint image and other sources, it is often difficult to reliably determine whether correlation data output signals for a particular fingerprint image point have one, two or three true correlation peaks. Therefore, an important feature of the invention is a correlation peak processing subsystem which increases the reliability of the assessment of the number and direction of the reference angle correlation peaks generated by the 5×5 scanning window. For example, in FIG. 4d and FIG. 4f there are correlation peaks 42 and 43, but only peak 42, represented by the corresponding correlation peak indicia 36, has been denoted as a true peak, whereas peak 43 is not a true peak. If peak 43 had been considered a true correlation peak, the corresponding point may have been erroneously treated as a tri-radii singularity which would increase the probability of either erroneously classifying the print or considering it too much of a deviation from canonical form thus precluding classification. It is the process and means for reliably interpreting the correlation peak data to produce an accurate representation of the singularities of a fingerprint image that is the gist of the invention.

Figure 5:
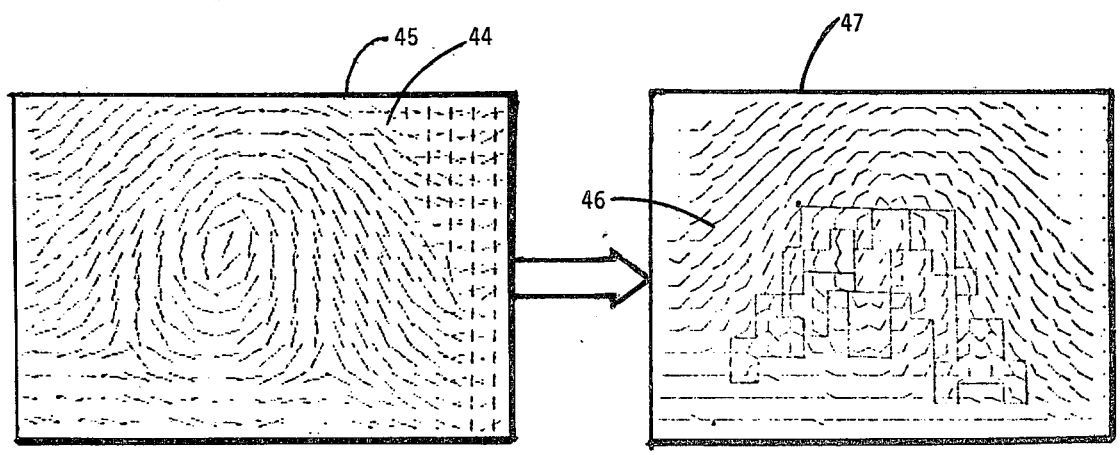
FIG. 5 is an illustration of the input and output data of the invention.

Referring now to FIG. 5, there is shown therein a graphical representation of the rough contour data constituting the input to the invention and the smoothed contour data with the singularities extracted and indicated, the output of the invention.

On the left side of FIG. 5 there is shown a portion of 29×29 matrix 44 of the input contour data. Each point 45 thereof is represented by 8 bits of information derived from the binary image minutiae and ridge contour detector 18 of FIG. 1. The 8 bits represent a 4 bit address and a 4 bit remainder which in combination define a specific direction of ridge contour data. Each such direction represents the average ridge contour data flow at that point in the fingerprint image. In the corresponding output of the singularity extraction apparatus of the invention, an equivalent matrix 47 comprises a plurality of vector elements 46. The number and direction of each such vector element is determined by the reference angle correlation means and the correlation peak processing logic of the invention.

Figure 6:
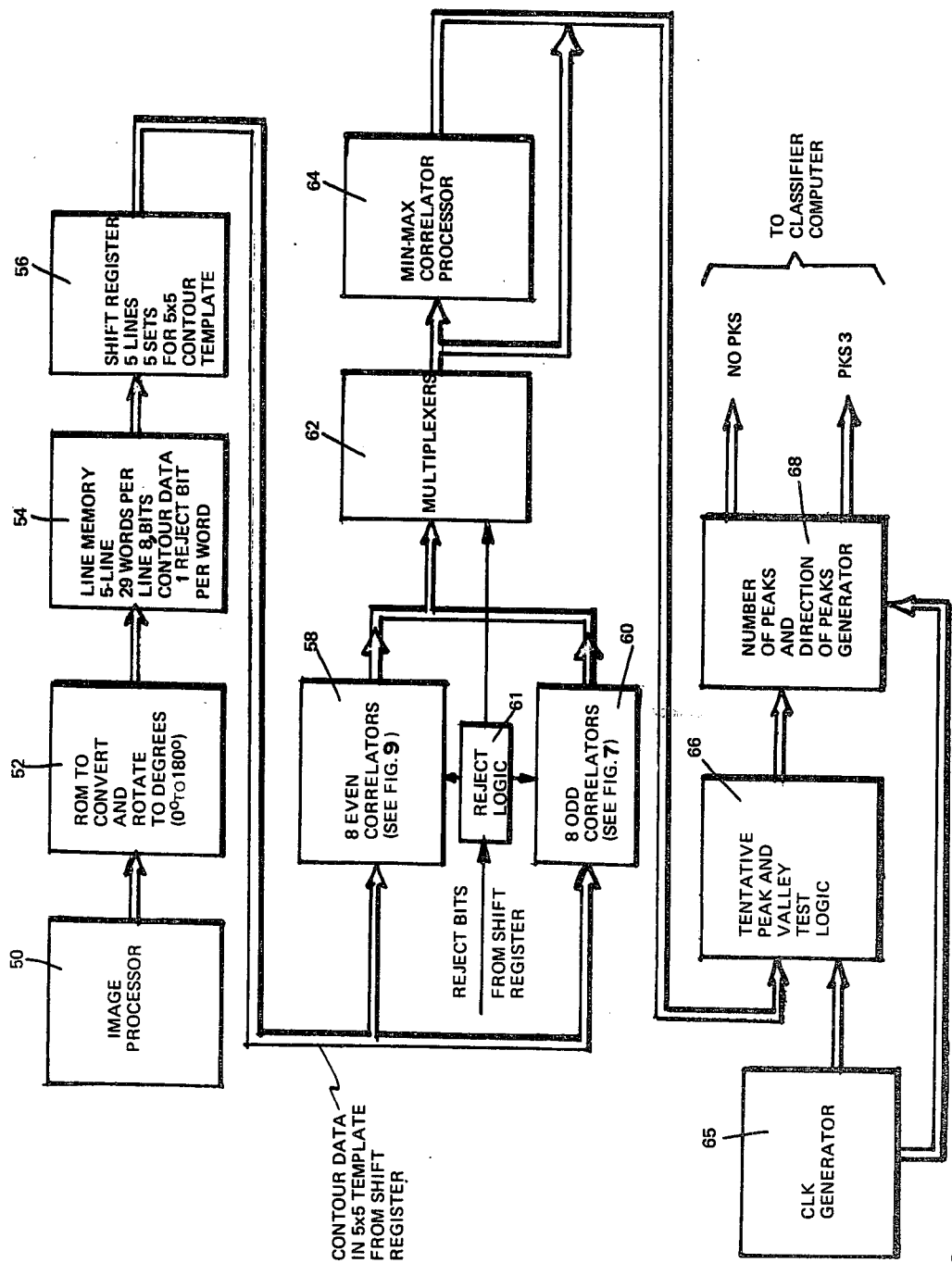
FIG. 6 is a general block diagram of the ANGFLOW circuit of the invention.

Referring now to FIG. 6 there is shown therein a simplified block diagram of the invention illustrating the information flow and processes performed on data input from the ridge contour detector to produce the number of peaks NOPKS and the direction of peaks PKS3 for each point in the 29×29 matrix illustrated in FIG. 5.

More specifically, the image processor 50 generates the contour data and applies it to the ROM 52 for data conversion and rotation to produce a set of angle related data referenced to a 0° to 180° coordinate system. The output signal of ROM 52 is an 8-bit word for each point of fingerprint data, comprising a 4-bit address and a 4-bit remainder defining the particular angle of the contour flow through that point. Also associated with each point is a 4-bit reject word which corresponds to the number of erroneous or missing bits of data in the original binary image derived from the fingerprint. In a preferred embodiment if this reject count exceeds 8, the information associated with the particular fingerprint point on the binary image under examination at that time is considered unreliable and is rejected. The output signals of the ROM 52, comprising 8 bits defining the angular direction of the contour line through that point and the 4 bit reject word, are applied to a line memory 54 which has the required memory capacity to store 5 lines of data at 29 words per line. Each word comprises 8 bits of contour data and one reject bit dependent upon whether the 4-bit word in ROM 52 equaled or exceeded the threshold setting for rejection. Line memory 54 is loaded by ROM 52 under computer control on a line-by-line basis, that is, the five-line line memory is sequenced one line at a time after each line of data is processed in the remaining portion of the invention.

The actual processing of the line memory data begins in shift register 56 which constitutes a 5×5 contour template. The shift register converts the serial line memory data into parallel form for five lines of data at five words per line. The effect is the equivalent of sliding the 5×5 contour template or scanning window across the 29×29 word matrix of contour data. At each stage of the scanning, the immediate area surrounding the single point located at the center of that 5×5 scanning window is examined to generate the corresponding correlations and peaks for each such point.

For each individual point in the 29×29 matrix of input contour data the ANGFLOW circuit ascertains the correlation of the direction of contour ridge flow at that point and in the immediate surrounding area within the 5×5 window by applying the data to a set of 16 correlators corresponding to 16 reference angle vectors. The correlators process the data in one of two ways depending upon whether they are located at even or odd multiples of $22\frac{1}{2}$ degrees from a first vector at zero degrees, (zero degrees equals horizontal to the right). Accordingly, there are two sets of correlators, one such set used for determination of correlation with vectors that are spaced at even multiples of 22½ degrees and one such set used for determination of correlation with vectors that are spaced at odd multiples of 22½ degrees. These sets are designated 58 and 60 respectively in FIG. 6. The reject bits generated in shift register 56 are also applied in an appropriate sequential order to reject logic 61 located in the block diagram between the two sets of correlators. The reject logic is used to determine the relationship between the reject bit and the data point under test by the 5×5 scanning window and to apply the result to the rest of the circuit so that the rejected point is precluded from a determination of the singularities of the fingerprint image. The output signals of reject logic 61 and each of the sets of correlators 58 and 60 are then applied to a set of multiplexers 62 which in effect enables a sequencing of correlation data from vector to vector of the 5×5 template, 22½ degrees at a time. The correlation value for each reference angle for a particular point is then processed through the remaining portion of the circuit to determine the number of true peaks and their relative directions.

The parallel output signals of multiplexers 62 are applied concurrently to min-max correlation processor 64 and to tentative peak and valley test logic 66. The min-max correlation processor 64 acts upon the correlation data to ascertain whether the data meets certain selected requirements for the minimum and maximum correlation values for the 16 reference angles in the 5×5 scanning window. The tentative peak and valley test logic 66 performs a series of threshold tests on individual peaks and valleys of correlation data and on their relative values and spacing in accordance with criteria which significantly enhance reliability of singularity extraction. These criteria have been established as a result of lengthy empirical software analyses and simulation utilizing large sets of fingerprint data bases.

If the min-max and peak and valley test criteria are all satisfied, the tentative peak and valley test logic 66 applies the resultant correlation signals, suitably processed, to the number of peaks and direction of peaks generator 68. As the name indicates, generator 68 derives the number of peaks corresponding to the number of vectors of the elements being examined and also derives the direction of peaks, that is, the direction of the respective vectors of the examined elements. These values are made available to the classifier computer (not shown) for further analysis of the curvature descriptors in the classification process.

Clock generator 65 provides the various clock signals used in test logic 66 and in generator 68 to sequence the correlation data through the system.

Figure 7:
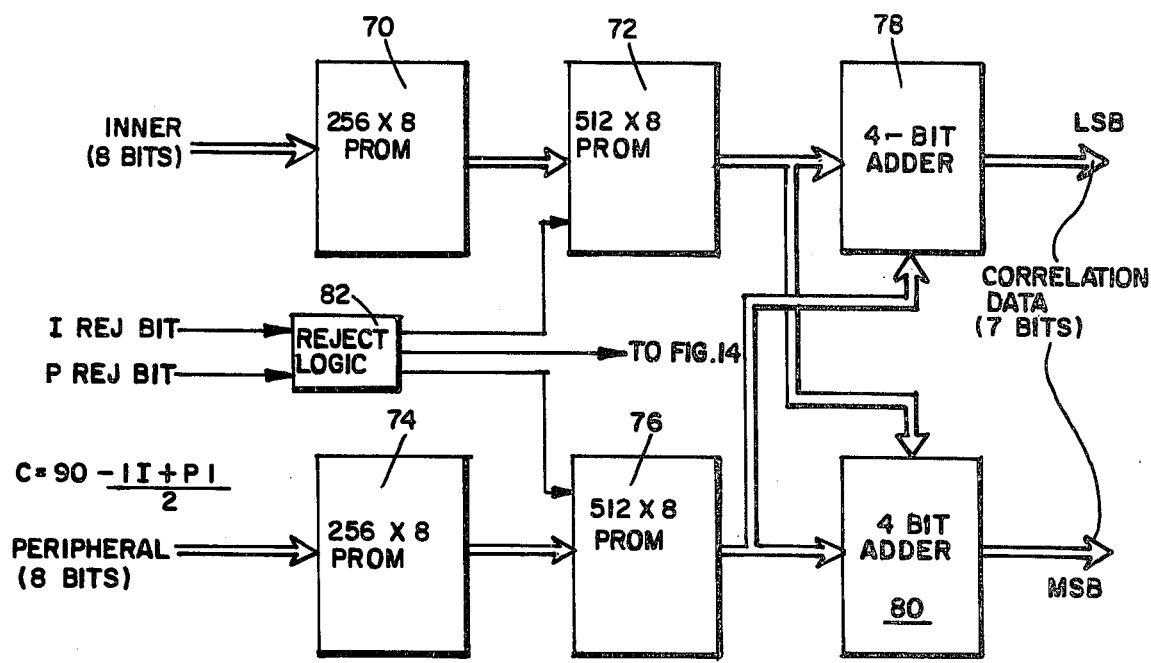
FIG. 7 is a logic block diagram of a first portion of the correlation logic of the invention.
Figure 8:
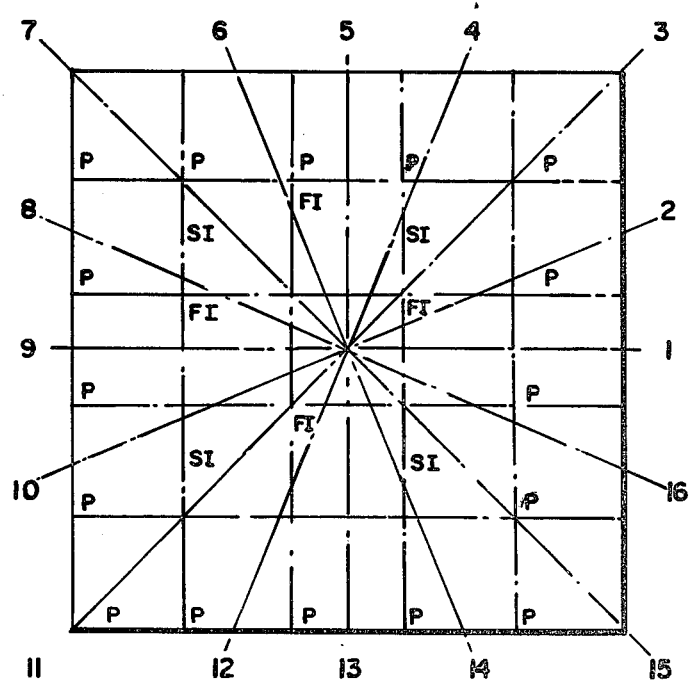
FIG. 8 is a graph-like representation of the 5×5 scanning window of the invention.
Figure 9:
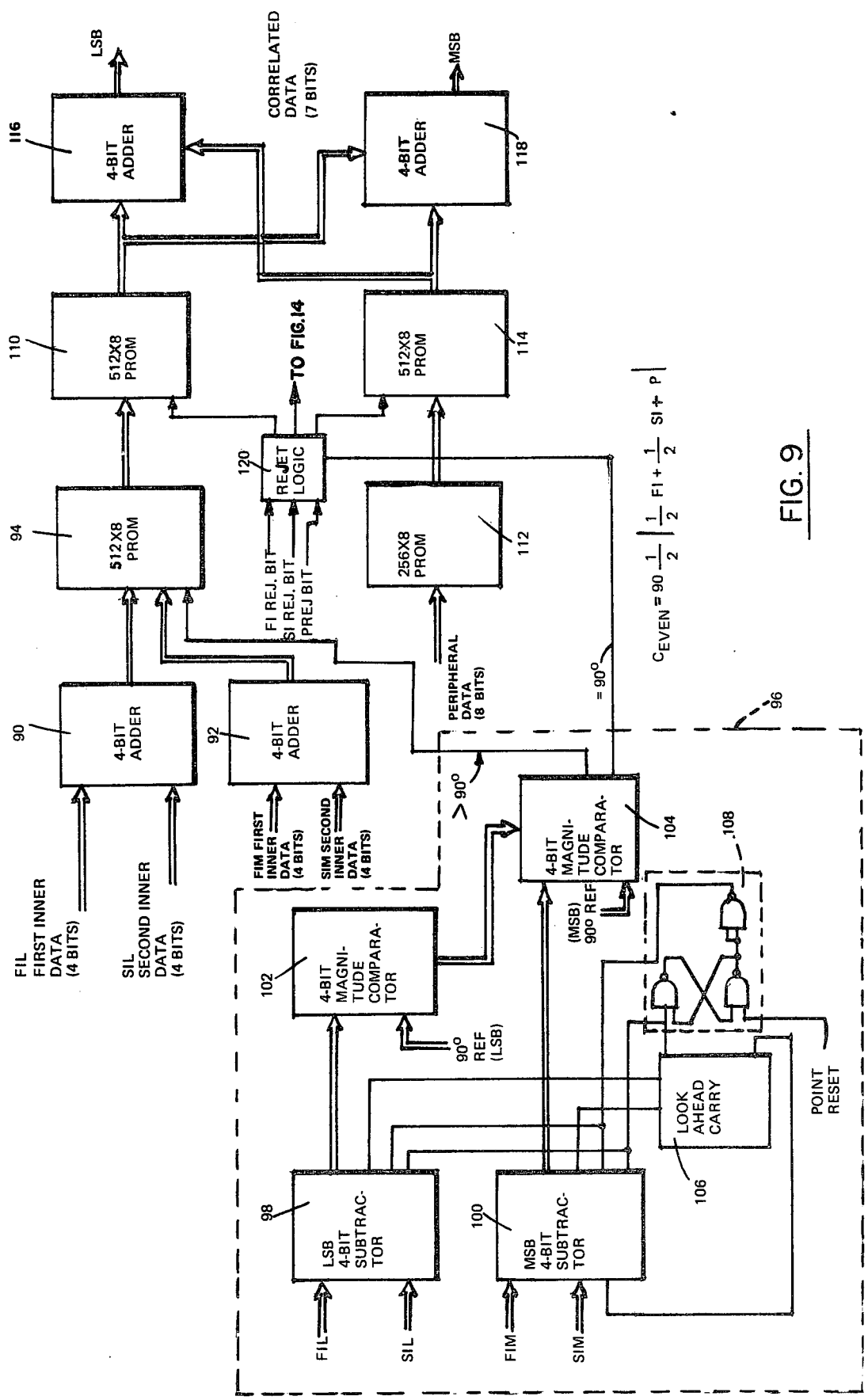
FIG. 9 is a logic-block diagram of a second portion of the correlation logic of the invention.

The operation of the correlators 58 and 60 may be best understood by reference to FIGS. 7, 8, and 9 taken together. FIG. 7 is a block diagram of a representative correlator of the odd correlator set 60. FIG. 8 is a graphical representation of the 5×5 scanning window including the 16 reference angle vectors and FIG. 9 is a block diagram of a representative correlator of the even correlator set 58.

Referring first to FIG. 8, it is shown therein that the 5×5 template or scanning window is an array of 25 sections. The peripheral sections of the 5×5 template are noted as such with the designation P in the lower left hand corner. The inner sections are designated as either first or second inner sections, FI and SI respectively, to indicate in what order the inner sections are traversed by even angular reference vectors starting at the center section and extending radially outward toward the peripheral sections. For convenience of discussion the 16 vectors are numbered in a counter-clockwise sequence beginning with vector one extending horizontally and to the right of the center section. The vectors are spaced around the central section.

The odd correlators determine the correlation of ridge flow with the odd numbered vectors, namely, 1, 3, 5, 7, 9, 11, 13, and 15. Similarly, the even correlators determine the correlation of ridge flow with the even numbered vectors, namely, 2, 4, 6, 8, 10, 12, 14 and 16. The logic for the even numbered vector correlations with ridge flow is more complex because those vectors pass through a first and a second inner section before reaching a peripheral section. The odd numbered vectors pass through only a single inner section before passing through a peripheral section. The correlation is determined on a section by section basis for each vector.

Referring now to FIG. 7 it will be seen that the correlation for an odd vector, denoted $C_{ODD}$, may be expressed as follows:

$$C_{ODD} = 90 - \frac{|I + P|}{2} \quad (1)$$

where I is equal to the angle between the ridge flow direction through the inner section of the vector under consideration and the direction of the vector and where P is equal to the angle between the ridge flow direction through the peripheral section through which the vector passes and the direction of the vector.

In the description throughout the remainder of this specification, reference is made to various logic devices. Table I is provided at this time to indicate model numbers of commercially available devices that correspond to those referred to hereinafter. The devices listed in Table I are examples only and are not intended to be limitative of the invention.

TABLE I

| FUNCTION | DEVICE* |
| --- | --- |
| SUBTRACTOR (ALU) | 74S381 |
| 2:1 MUX WITH MEMORY | 74298 |
| MAGNITUDE COMPARATOR | 7485 |
| REGISTER | 74298 |
| ADDER | 74283 |
| 256 × 8 PROM | 74S471 |
| 512 × 8 PROM | 74S472 |
| SHIFT REGISTER | 74164 |
| LOOK AHEAD CARRY | 74182 |
| UP/DOWN COUNTER | 74193 |
| 2:1 MUX | 74157 |
| 8:1 MUX | 74151 |

*ALL DEVICES LISTED ABOVE ARE DESCRIBED IN DETAIL IN "THE TTL DATA BOOK FOR DESIGN ENGINEERS" SECOND EDITION, 1976 BY TEXAS INSTRUMENTS INC., DALLAS, TEXAS.

As indicated in FIG. 7, the ridge flow data derived from the shift registers (see FIG. 6) is applied to PROMS 70 and 74 respectively. Ridge flow data for the inner section through which the vector under consideration passes is applied to PROM 70 and ridge flow data corresponding to the peripheral section through which the vector under consideration passes is applied to PROM 74. The 8 bits of either inner or peripheral section data which are applied to the respective PROM comprise an address for which a corresponding set of signals previously programmed into the PROM, is generated and made available at the output of the PROM. In each case the output is dependent upon the angular relationship between the vector under consideration and the ridge flow with the 5×5 scanning window centered on the fingerprint data point under consideration in the 29×29 matrix of ridge contour data.

As previously indicated, each such point also has associated with it a reject count and a corresponding reject bit. The logical truth state of the reject bit is a function of whether or not the reject count exceeds some preselected value for considering information unreliable. The reject bits for the inner and peripheral sections of the vector under consideration are applied to reject logic 82 which, in turn, applies corresponding signals to each of the PROMS 72 and 76. The output signals of PROM 70 and 74 are applied to PROMS 72 and 76 respectively. If the reject bits for all sections through which the vector passes are ONES, indicating an unreliable data point at this point of the 29×29 matrix, the correlation data for the point is disregarded. On the other hand, if only one of the reject bits is in a ONE state, indicating that only one of the two sections through which the vector passes contains unreliable ridge flow data, then only the corresponding PROM is ignored and the output of the remaining PROM is multiplied by two to account for the use of only one section. Clearly, if neither reject bit is in a ONE state, indicating that the contour data flow through both the inner and peripheral sections contains fewer errors than a preset threshold, the output signals of both PROM 72 and 76 are utilized in the calculation of correlation with the final addition taking place in 4-bit adders 78 and 80. The combined outputs of address 78 and 89 correspond to a 7-bit representation of the correlation value which is in the range 0 to 90. Accordingly, 90, the highest value of correlation that may be represented, indicates ridge flow data which lies parallel to the odd vector under consideration and 0 indicates a condition of perpendicularity between the ridge flow and the vector under consideration.

In FIG. 8 it will be seen that all of the even vectors of the 5×5 scanning window traverse both a first inner section and a second inner section, denoted FI and SI respectively, before traversing a peripheral section. Accordingly, as indicated in FIG. 9 the correlation for even numbered vectors takes into account the average ridge flow direction through three sections, the first inner section, the second inner section and the peripheral section through which the subject vector passes radially outward from the center of the 5×5 window. The correlation for an even vector may be represented as follows:

$$C_{EVEN} = 90 - \frac{1}{2} \cdot \left| \frac{1}{2} FI + \frac{1}{2} SI + P \right| \quad (2)$$

where FI, SI and P have the same meaning as I and P for odd correlation. (See Equation 1)

The even correlator as exemplified by FIG. 9, includes 4-bit adders 90 and 92, 256×8 PROM 94, 512×8 PROM 110, 256×8 PROM 112, 512×8 PROM 114, 4-bit adders 116 and 118, and an inner section comparator 96. Except for the inner section comparator 96, the even correlator is based upon the same principal as the odd correlator with data for the two inner sections being averaged before being applied as a combined address signal to the 512×8 PROM 94. Peripheral section data is applied to the 256×8 PROM 112 in the same manner as in the odd correlation circuits. In addition, a reject logic circuit 120 accepts three reject bits, one each for the two inner sections and one for the peripheral section. Reject logic circuit 120 then applies reject logic control signals as a portion of the address to PROMS 110 and 114 to determine whether data relating to all of the sections through which the vector under consideration passes should be used to calculate the correlation.

The addition of data relating to the two inner sections is accomplished by adders 90 and 92. Calculation of the correlation with respect to all three sections is accomplished in PROMS 94 and 112. Acceptance or rejection of the result and appropriate modification of the correlation, which is dependent upon whether or not any reject bits are in a ONE state, takes place as previously described in the 512×8 PROM 110 and 114. The results for the inner section channel and for the peripheral section channel are then added by adders 116 and 118 to produce the correlation data shown at the right of FIG. 9.

Inner section comparator 96 includes the logic necessary to compare the angular relationship of the contour data flow in the two inner sections to determine how that portion of the correlation equation should be treated by PROM 94. For example, if the directions of contour data in the respective inner sections are greater than 90° apart, the complement of that angle is used in the remaining portion of the correlation calculation. If their angular relationship is less than 90° they are used as is. If they are 90° apart the data is rejected and the inner section contribution to correlation is ignored.

The comparison of the inner section data is accomplished by subtracting the second inner section contour data from the first inner section contour data by means of 4-bit subtractors 98 and 100 operating in conjunction with look ahead carry logic 106 and absolute subtraction logic 108. Absolute subtraction logic 108 insures a positive outcome of the subtraction process. The manner in which this is accomplished is well known to those familiar with the digital logic arts and need not be elaborated upon here. The output signals of subtractors 98 and 100 are then applied to 4-bit magnitude comparators 102 and 104, respectively. The least significant four bits and the most significant four bits of the angle difference between the first and second inner sections are individually compared with corresponding least significant bit and most significant bit portions of a 90° reference signal applied to the second set of input terminals of four-bit comparators 102 and 104. The output signal of magnitude comparators 102 and 104 is available at the output terminal of 4-bit magnitude comparator 104 and is applied as a portion of the address signals to 512×8 PROM 94. This portion of the address determines whether the output of the PROM is the product of the complement of the inner section data or the product of inner section data per se.

As a result of the correlation processes of the sets of even and odd correlators corresponding to the 16 vectors represented in FIG. 8, a set of correlation data is produced for each contour data point. Each contour data point, therefore, has associated with it a set of 16 correlation values, in the range of 0 to 90, for each of the 16 reference vectors. FIG. 10 is an illustration of such an output and the corresponding tri-radial vector element of three-peak correlation data is indicated. For illustrative purposes, correlation data is shown for three peak signals, namely, peaks 120, 122 and 124. These peak signals correspond to the tri-radial element having three vectors, namely 126, 128 and 130 with the directions functions of where in the sixteen reference angle positions the correlation peaks occur.

The remaining portion of the invention comprises the correlation peak processing logic which is used to determine whether the peaks located in the correlation measurement process are genuine and should be part of the smoothed contour element array (See FIG. 5). It will be recalled that there is one correlator of either the type indicated in FIG. 7 or the type indicated in FIG. 9 for each of the sixteen vectors of the 5×5 scanning window. In order to minimize the cost and size of the electronics associated with the invention, the data for the sixteen correlators are multiplexed for application to be correlation peak processing logic. Multiplexers 62 apply the correlation data in time sequence to the min-max correlation processor 64 and to the tentative peak and valley test logic 66; see (FIG. 6). The data is sequenced through these circuits two times, (referred to below as two passes). The first pass is used to determine whether or not the correlation data satisfies a min-max threshold requirement. If the requirement is satisfied, the peak and valley test logic is used to further examine the reliability of the correlation data to produce an indication of the number of peaks and the direction of peaks for the 5×5 portion of the contour data array under examination.

Referring now to FIG. 11 it will be observed that the correlation data available at the output of the multiplexers is applied to two sets of logic circuits designated min value and max valve respectively. Each such set comprises two four-bit magnitude comparators and two four-bit registers. The min value set includes four-bit magnitude comparators 140 and 142 and four-bit registers 144 and 146 and the max value set includes four-bit magnitude comparators 148 and 150 and four-bit registers 152 and 154. In addition, selection logic circuits 141 and 156, of the min and max value sets respectively, respond to the output signals of the four-bit magnitude comparators for controlling the contents of the four-bit registers.

More specifically the correlation data from the multiplexers is applied sequentially to the four-bit magnitude comparators in both the min value and max value logic sets. The correlation data is also applied simultaneously to the four-bit registers in those sets. The output signals of the four-bit registers are fed back as second inputs to the four-bit magnitude comparators. Thus, the four-bit magnitude comparators continuously compare the current correlation data to the previously received correlation data. For the min value logic set, the four bit magnitude comparator generates a TRUE signal indication of the condition in which the current value of correlation data is less than the previously received value of correlation data. When this occurs, the TRUE output signal, applied to the selection logic 141, results in a command signal applied to the four-bit registers 144 and 146 to dump the previously retained correlation data and to load the newly received correlation data. If, on the other hand, the current correlation data is greater than the previously received correlation data, a FALSE signal, applied to the selection logic 141 of the min value set, causes four-bit registers 144 and 146 to retain the previously received data and to ignore the currently received correlation data. It will be observed that when this process is performed for all 16 values of correlation data generated, the final value stored in the four-bit registers 144 and 146 corresponds to the minimum value of the 16 correlations.

The max value logic set operates in a similar manner. The principal difference between the two sets is that the output of four bit magnitude comparator 148 and 150 is in a TRUE condition when the newly received correlation data is greater than the previously received correlation data. Thus, the four-bit registers 152 and 154 are commanded to dump their previous contents and load the newly received correlation data each time the newly received correlation data is greater than the previous correlation data. Eventually the contents of the four-bit registers correspond to the maximum of the 16 correlation values. By the end of the first pass of correlation data, the values representative of the correlation with respect to the 16 reference vectors for a given contour data point are transferred to the min-max correlation processor. The min max logic circuits then contain the minimum and maximum values of the 16 correlation values.

Figure 12:
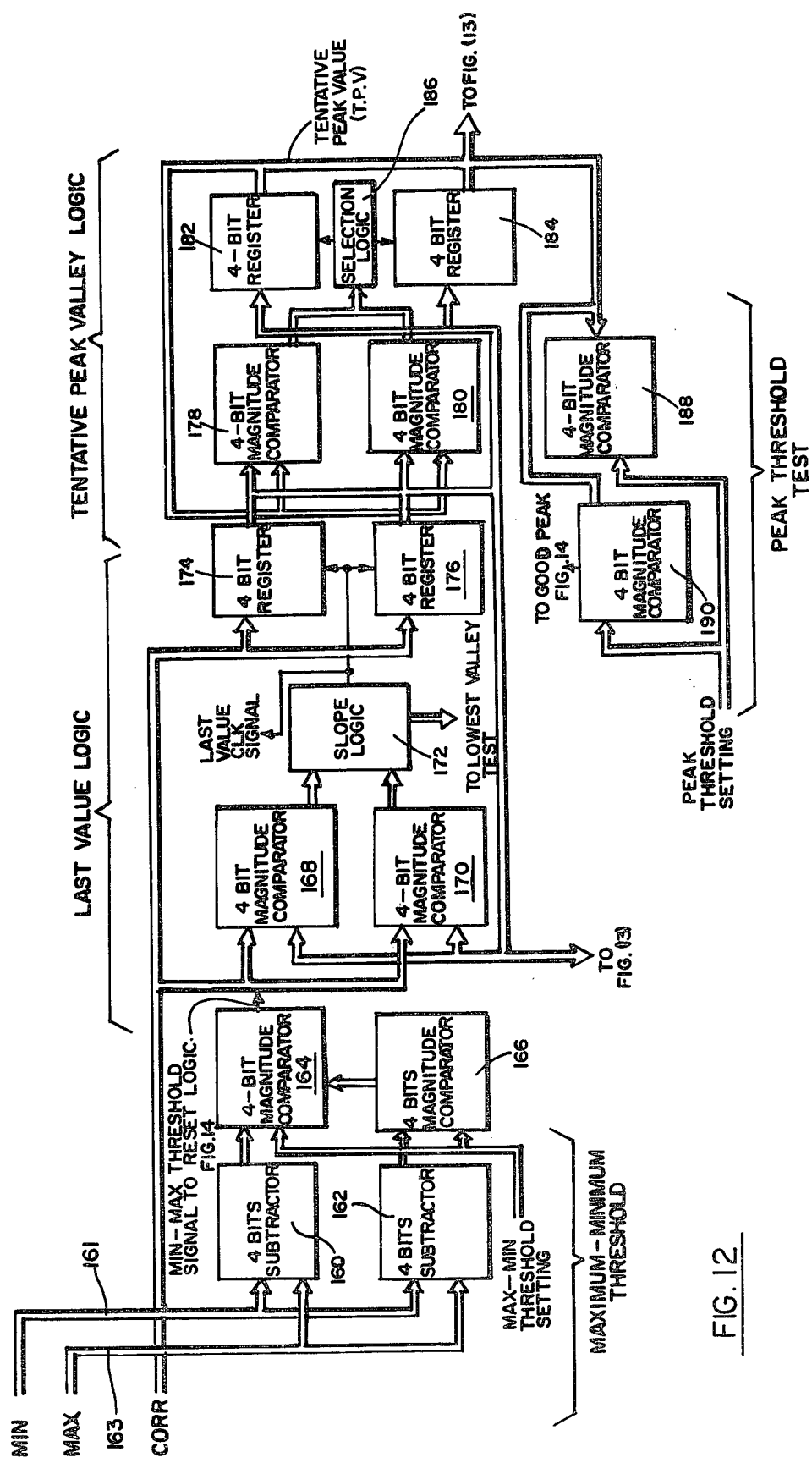

Referring now to FIG. 12, it will be observed that the min-bus 161 and the max-bus 163 are connected to maximum-minimum threshold logic comprising four-bit subtractors 160 and 162 and four-bit magnitude comparators 164 and 166. The function of the maximum-minimum threshold logic is to determine the difference between the maximum and minimum values and to compare this difference against a threshold setting which corresponds to some previously determined threshold for this parameter. In one embodiment of the invention, this threshold setting is 21, that is, the value of the minimum correlation subtracted from the value of the maximum correlation must exceed 21 for the invention to process the correlation data for the contour data point under consideration.

As also indicated in FIG. 12, the correlation data is applied to other logic circuits identified as the Last Value Logic circuit and as the Tentative Peak Value Logic circuit. The Last Value (LV) and Tentative Peak Value (TPV) are used in the correlation peak processing portion of the invention to determine whether or not the contour data point being evaluated meets selected criteria for reliability of singularity extraction. One of those criteria, for example, is a peak threshold test. Such tests are only performed on the contour data point under evaluation if the min-max threshold test previously discussed is satisfied. The outcome of the min-max threshold test is represented by the output signal of four-bit magnitude comparator 164. This signal is applied to reset logic 234 shown in the upper left hand corner of FIG. 14. The reset logic will be discussed below in conjunction with FIG. 14.

As shown in FIG. 12, the Last Value logic and Tentative Peak Value logic consists of the following components: Four-bit magnitude comparators 168, 170, 178 and 180, the four-bit registers 174, 176, 182 and 184, slope logic circuit 172 and selection logic circuit 186. One of the functions of the Last Value logic circuit is to retain the immediately preceding correlation value in four-bit registers 174 and 176 so that this data can be processed in the remaining portions of the invention. In other words, the Last Value logic constitutes a form of memory which may be reloaded as appropriate in accordance with the time sequence for processing the correlation peaks. Another function of the Last Value logic is to determine the direction of change of the correlation data, that is, to provide an indication of whether the correlation data is increasing or decreasing as each new correlation value is processed. This is accomplished by slope logic 172 and four-bit magnitude comparators 168 and 170. Comparators 168 and 170 continually compare the currently received correlation data with the last value data, and indicate whether the current value is less then or greater than the previously received value. The magnitude comparators produce output signals indicative of this relationship and these output signals are applied to slope logic 172 to provide an indication of the polarity of the slope. This information is utilized in the Lowest Value test circuit which will be discussed below in conjunction with FIG. 13.

Slope logic circuit 172 also controls four-bit registers 174 and 176 so that those registers dump their contents and store the newly received correlation values unless the two are equal, in which case the current contents of the four-bit registers are retained.

The Tentative Peak Value logic circuit is also a feedback arrangement including four-bit registers 182 and 184 and magnitude comparators 178 and 180. The last value LV, generated by the Last Value logic circuit, is applied to the comparator along with the fedback output signal of the four-bit registers. This arrangement enables the comparison between the currently received last value and the previously received and stored last value. The magnitude comparator changes the contents of the four-bit register to correspond to the most recently received last value only when that value exceeds the previous value. Consequently, the output of the four-bit register is treated as a tentative peak value TPV. The selection of peak values is made by selection logic 186 in response to the output signal of comparators 178 and 180.

One of the uses for the tentative peak value TPV is the peak threshold test the logic for which is shown in the lower right hand portion of FIG. 12. The peak threshold test logic comprises a pair of four-bit magnitude comparators 188 and 190 to which one input signal is the tentative peak value TPV and to which another input signal is a peak threshold setting which may be any predetermined value in the range of correlation possibilities, that is, in the range of 0 to 90. In one embodiment of the invention, the peak threshold setting is 45. An indication of whether or not the tentative peak value surpasses the peak threshold setting is provided by the signal at the output terminal of four-bit magnitude comparator 190. This signal is applied to good peak logic 238 shown in the left hand portion of FIG. 14. This portion of the invention will be discussed below in conjunction with FIG. 14.

Figure 13:
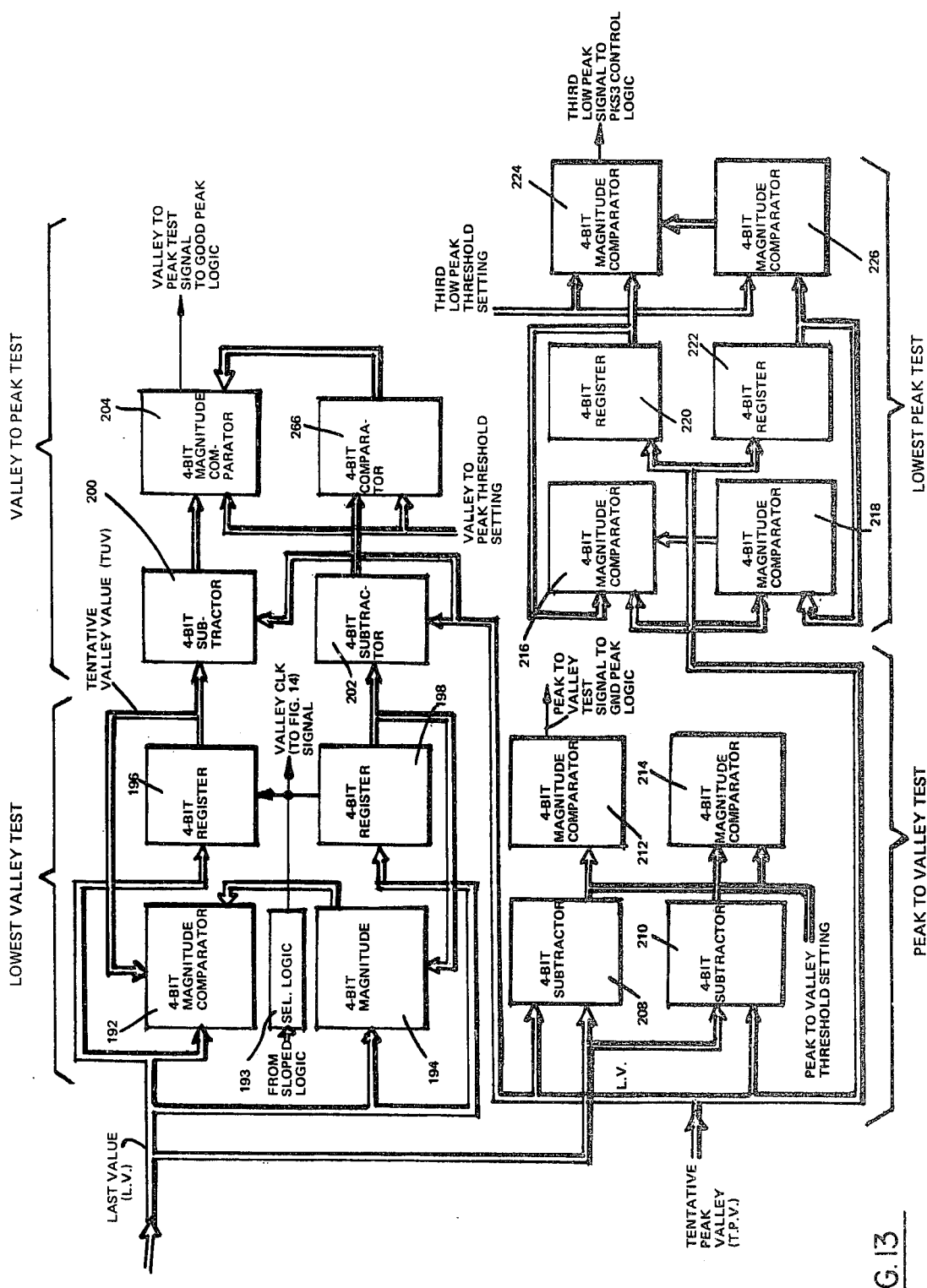

Referring now to FIG. 13 there are shown therein four test circuits used to evaluate the correlation data to determine whether or not the peaks and valleys meet certain value and spacing criteria. These four circuits are designated the Lowest Valley test, the Valley to Peak test, the Peak to Valley test and the Lowest Peak test circuits, respectively.

As indicated on the left side of the side of FIG. 13, the input signals to these four test circuits are the Last Value signal LV and the Tentative Peak Value signal TPV, both derived by the logic circuit of FIG. 12 as previously described. The Lowest Valley test circuit comprises 4-bit magnitude comparators 192 and 194, selection logic 193 and 4-bit registers 196 and 198. The last value signal LV is applied to the 4-bit magnitude comparators and simultaneously to the 4-bit registers. The output of the 4-bit registers is fed back to the magnitude comparators which in combination generate a TRUE signal when the magnitude of the last value signal LV currently being received is less than the magnitude of the last value signal LV that had been previously received and stored in the 4-bit register. When this occurs, selection logic 193 is enabled and the 4-bit registers dump their contents and load the next available last value signal. The signal produced at the output of 4-bit registers 196 and 198 is called the tentative valley value TVV. The tentative valley value represents the lowest of a series of correlation values as the pass progresses. Selection logic 193 receives a slope signal from the slope logic circuit 172, (See FIG. 12). In effect, the slope signal enables selection logic 193 for negative slope in correlation values and disables it for a positive slope. Thus, the 4-bit register dump and reload operation is accomplished only during a negative slope portion of the correlation sequence.

The Peak-to-Valley test circuit, shown in the lower left hand portion of FIG. 13, comprises 4-bit subtractor 208 and 210 and 4-bit magnitude comparators 212 and 214. The Peak-to-Valley test circuit acts upon the Tentative Peak Value TPV developed as previously described in the Tentative Peak Value logic circuit shown in FIG. 12. Subtractors 208 and 210 perform the subtraction process on the Tentative Peak Value TPV and the Last Value LV so that the output signal of the subtractors represents the difference between these two sets of values. The output signal of the subtraction process is applied to 4-bit magnitude comparators 212 and 214 to which Peak-to-Valley threshold settings, corresponding to previously determined threshold values, are also applied: A comparison is made to determine whether or not the difference between the peak value and the last value at any time exceeds the threshold setting. The output of magnitude comparator 212 is indicative, by its truth state, of whether or not this condition exists and is applied to the Good Peak logic 238 to be discussed below in conjunction with FIG. 14.

It will be seen below that the Good Peak logic receives a signal from the slope logic 172 (see FIG. 12) which indicates when the slope changes from either positive to negative or negative to positive in the sequence of correlation data. The Peak-to-Valley test signal is utilized when the slope of correlation data changes from negative to positive indicating that a valley has just been processed. This occurs upon the first rise of correlation data after a valley value is transmitted. At this time the Last Value LV represents the value of a valley and thus the difference between the last stored Tentative Peak Value TPV and the Last Value stored LV will represent the actual difference between the immediately past occurring value of a valley and the immediately prior occurring value of a peak.

The Valley-to-Peak test circuit comprises 4-bit subtractors 200 and 202 and 4-bit comparators 204 and 206. The subtractors generate the difference value between the Tentative Peak Value TPV and the Tentative Valley Value TVV generated by the Lowest Valley test circuit. The output of the subtractors is applied to 4-bit magnitude comparators 204 and 206 to which a Valley-to-Peak threshold setting is also applied. In a preferred embodiment, the threshold setting for both Peak-to-Valley and Valley-to-Peak tests is 21, meaning that for a peak to be considered a true correlation peak its value must exceed the value of the prior valley and the next occurring valley by more than 21. The output of 4-bit magnitude comparator 204 represents the test results, namely whether or not the threshold setting was exceeded by the difference between the Tentative Peak Value TPV and the Tentative Valley Value TVV. This output which is referred to as the Valley-to-Peak test signal, is applied to the Good Peak logic of FIG. 14.

In the lower right hand portion of FIG. 13 there is shown the Lowest Peak test circuit which is used in cases of tri-radii, (that is, where there are three peaks at one singularity point) to determine whether or not the lowest peak exceeds a pre-determined threshold value. In a preferred embodiment this value is 62. It has been found by testing of substantial data bases that in cases where the processing system detects three peaks, that the peak of lowest value is usually unreliable unless it exceeds the value 62. Accordingly it is the function of the Lowest Peak test circuit of FIG. 13 to determine which peak is of the lowest value and, if there are three peaks, to respond thereto to determine whether or not the lowest peak stored exceeds a predetermined low peak threshold setting. This is accomplished by means of 4-bit magnitude comparators 216, 218, 224 and 226 and 4-bit registers 220 and 222. As shown in FIG. 13 the Tentative Peak Value TPV is applied to the 4-bit registers 220 and 222, the output signals of which are applied to 4-bit magnitude comparators 224 and 226. Also applied to the last mentioned magnitude comparators is the third low peak threshold setting which is compared against the output of 4-bit registers. The result of this comparison is the third low peak test signal which is applied to PKS3 control logic in FIG. 14 which will be discussed below. In response, the PKS3 control logic circuit may enable the 4-bit registers 220 and 222 to dump their present contents and load the currently received Tentative Peak Value TPV. In this way the value of each peak is tested against the third lower peak threshold setting to determine whether or not it exceeds the predetermined value for this threshold. It will be clear that this test is performed with all three peaks because it will not be known in advance whether this is a three peak case and if it is whether the currently received peak is the lowest of the three.

This latter information, namely, whether the current peak is the lowest of the three that may be received for particular contour data point, is determined by feeding back the values stored in the 4-bit registers 220 and 222 as a comparison input to 4-bit magnitude comparators 216 and 218 which compare the stored value with the currently received Tentative Peak Value TPV. The result of this comparison are test signals which are applied to 4-bit registers 220 and 222. Thus it is clear that the Lowest Peak test circuit determines which of the peaks is the lowest value and whether or not that lowest peak exceeds a preset threshold.

Figure 14:
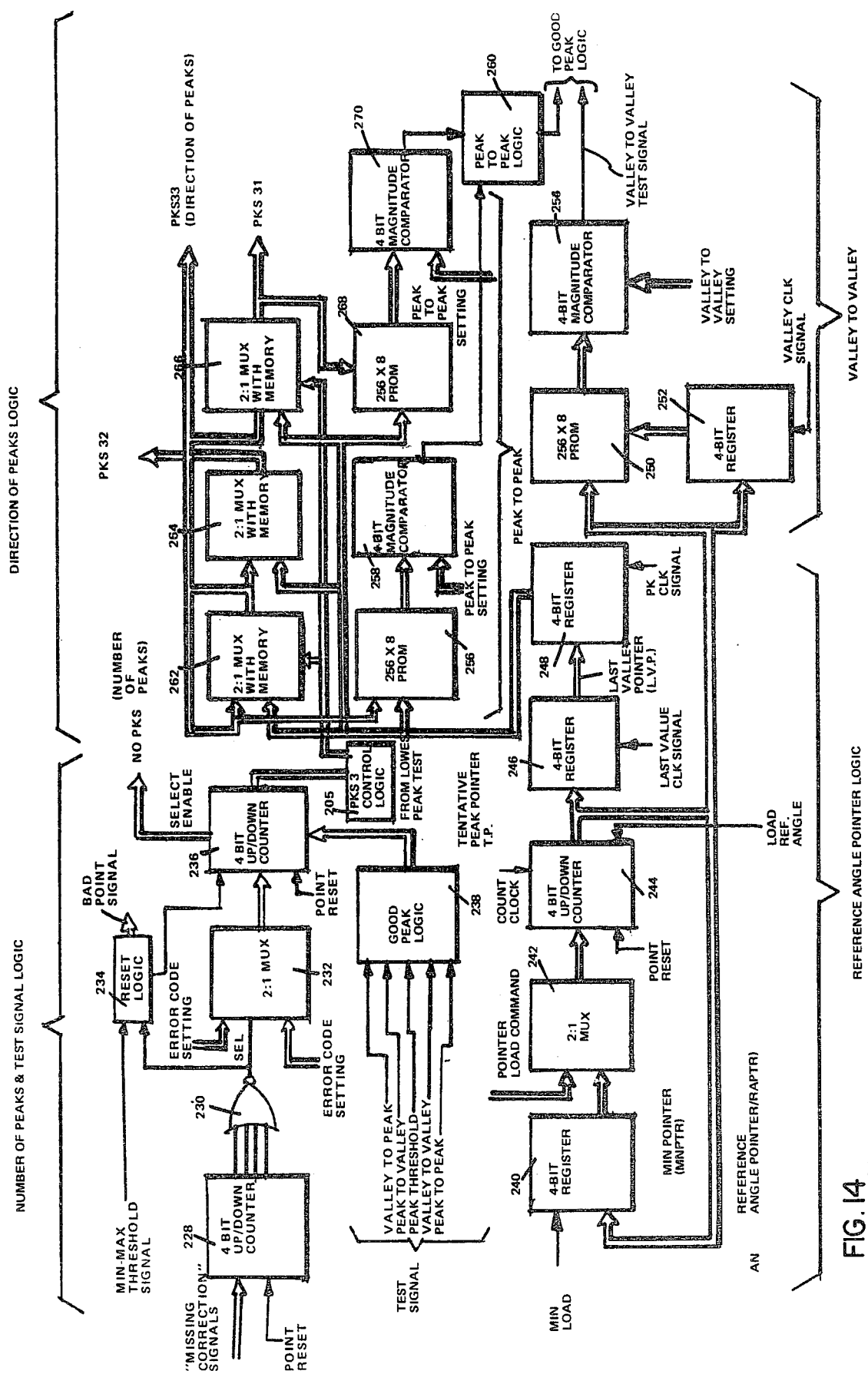

Referring now to FIG. 14, there are shown therein the test circuits to determine whether or not the Peak-to-Peak and Valley-to-Valley spacing requirements are satisfied by the correlation data currently being evaluated. In addition, because these two test circuits depend upon an evaluation of the reference angle data of each peak and valley, reference angle pointer logic is also included to provide an indication of the reference angle vector corresponding to each peak and valley. Also shown in FIG. 14 are direction peaks logic and number of peaks logic circuits. These logic circuits respond to the various test signals, each of which is representative of whether or not the correlation data has satisfied the criteria for peak evaluation, to generate a signal representative of the actual number of peaks detected for the point of contour data under evaluation and signals indicating the direction of each of those peaks. Table II summarizes the various tests to which the correlation data is subjected.

TABLE II

| CORRELATION PARAMETER | TEST |
|---|---|
| MAX TO MIN | 21 |
| PEAK TO VALLEY | 21 |
| VALLEY TO PEAK | 21 |
| PEAK THRESHOLD | 45 |
| VALLEY TO VALLEY SPACING | 67½ DEGREES |
| PEAK TO PEAK SPACING | 67½ DEGREES |
| LOWEST THIRD PEAK | 62 |

The reference angle pointer logic comprises 4-bit registers 240, 246 and 248, 2-to-1 MUX 242 and 4-bit up/down counter 244. The purpose of the reference angle pointer logic is to provide a representation of the vector direction to which the current correlation data corresponds. A description of the manner in which this is achieved now follows.

It will be recalled that there are two passes of correlation data of each contour data point into the min-max correlation processor and correlation peak processing portion of the invention. The first pass commences with the first vector and proceeds in sequence for each of the 16 vectors in the 5×5 scanning window. However, the second pass commences with the vector corresponding to the minimum value of correlation measured during the first pass in the min value logic circuit of FIG. 11. At the beginning of the first pass, the point reset signal resets 4-bit up/down counter 244 and the count clock signal then sequentially increments the count of counter 244, one count for each correlation data value. Simultaneously, in the min value circuit of FIG. 11 each time 4-bit registers 144 and 146 are enabled to load the current correlation value, the min load signal also enables 4-bit register 240 in FIG. 14 to load the current count output of counter 244. As a result, after all 16 correlation values have been examined during the first pass, the output signal of register 240 corresponds to the reference angle position of the minimum value correlation. This output signal is denoted minimum pointer NMPTR and the output signal of counter 244 is denoted reference angle pointer RAPTR. The min pointer signal MNPTR is applied to 2-to-1 multiplexer 242. As shown in FIG. 14, the second input to 2-to-1 multiplexer 242 is a pointer load command. This signal permits loading of the multiplexer with an alternative signal input by manual means to force the pointer to another location. However, under ordinary conditions of operation it is the min pointer MNPTR that is selected by 2-to-1 multiplexer 242 for application to the input terminals of up/down counter 244. At the beginning of the second pass, the clock generator of FIG. 5 generates a load reference angle signal which forces counter 244 to load a new count corresponding to the signals available at its input terminals. In this case these input signals are the min pointer signals MNPTR. Thereafter, during the second pass of correlation data, the count clock signals increment the counter until the count reaches 15, that is, the last angle position. The counter then automatically reaches zero and continues to count up from zero back to the pointer corresponding to the minimum correlation value. Thus, in both passes one and two the counter completes a full cycle of counting. The count starts at zero, that is the first angle reference position, during the first pass and starts at the reference angle position of minimum value of correlation during the second pass. In both passes the output of the counter represents the reference angle position of the correlation data under evaluation.

Thus, the reference angle pointer signal RAPTR is available at the output of 4-bit up/down counter 244. As shown in FIG. 14, the pointer signal RAPTR is applied to 4-bit register 246 and is loaded into this register at the occurrence of the last value clock signal generated in last value logic as indicated in FIG. 12. The output signal of 4-bit register 246 is accordingly designated the last value pointer LVP since it is an indication of the reference angle position corresponding to the last value generated in the last value logic. The last value pointer LPV is applied to 4-bit register 248 to which a peak clock signal generated in selection logic 186 of the tentative peak value logic circuit of FIG. 12 is also applied. Accordingly, the output of 4-bit register 248 is designated tentative peak pointer TP because it is an indication of the reference angle position corresponding to a tentative peak value generated in the Tentative Peak value logic.

Reference angle pointer RAPTR is also applied to 256×8 PROM 250 and to 4-bit register 252. A valley clock signal, generated by selection logic 193 in the Lowest Valley test circuit of FIG. 13, is also applied to 4-bit register 252. The output signal of 4-bit register 252, in combination with the pointer signal RAPTR comprises the address to PROM 250. The output signal of PROM 250 represents the value stored for the various combined signal addresses in response to the output signal of the 4-bit register 252 and the reference angle pointer RAPTR. PROM 250 is programmed so that the output signals represent the difference between the current pointer signal applied to the PROM and the stored pointer signal which corresponds to the newly detected valley clocked into the register in response to the valley clock signal. This difference is applied to the 4-bit magnitude comparator and compared against a Valley-to-Valley setting which, in a preferred embodiment of the invention, is equal to three.

Thus, the Valley-to-Valley test circuit produces an output test signal which indicates whether the spacing in reference angular positions between the current pointer and the pointer corresponding to the prior occurring valley is greater than or less than three. This signal is applied to Good Peak logic 238 as an input test signal corresponding to one of the several criteria for reliable peak and valley data. The Good Peak logic utilizes the Valley-to-Valley signal only when the signal from the slope logic circuit 172 of FIG. 12 indicates that the current pointer corresponds to a valley of correlation data. Thus, the Valley-to-Valley test signal is recognized only when it indicates spacing between a presently occurring valley and a prior occurring valley.

The Peak-to-Peak test circuit, shown in the right hand port of FIG. 14, performs a function similar to that of the Valley-to-Valley test circuit, namely, to determine whether or not the spacing between peaks meets a pre-established criterion for acceptability. In a preferred embodiment the peaks must be spaced by more than three reference angle positions in order for the most recently occurring peak to be considered valid.

The Peak-to-Peak test circuit includes PROMS 256 and 268, 4-bit comparators 258 and 270, and Peak-to-Peak logic circuit 260. The address signals applied to the PROM comprise the tentative peak pointer signals TP available at the output terminals of 4-bit register 248 and signals generated within the direction of peaks logic which indicate the direction of an established peak reference angle. The PROM is programmed so that its output signals correspond to the pointer difference or the spacing difference between the two sets of input pointer signals at its address terminals. The output signals of PROM 256 are compared against a Peak-to-Peak setting in 4-bit magnitude comparator 258 and the output signal of the comparator is indicative of whether or not the current tentative peak is spaced more or less than three reference angle positions, or 67½ degrees, from the prior peak.

As will be discussed below, 2-to-1 MUX with memory 262 in the direction peak logic circuit always contains most recently received and verified correlation peak data. Thus, the subtraction and comparison made in PROM 256 and in comparator 258 is between the first occurring correlation peak and a subsequent correlation peak. Then the second occurring peak is compared with the subsequent peak if a third peak is detected. The third peak is then compared with the first peak for spacing. This last comparison is accomplished by means of PROM 258 and 4-bit comparator 270. The input to PROM 268 is derived from the 2-to-1 MUX with memory 266 of the direction of peaks logic circuit which stores the first peak which is compared against the last peak.

Thus, by the combination of PROMS 256 and 268 and magnitude comparators 258 and 270, the spacing between all adjacent peaks is tested and the output signals are applied to Peak-to-Peak logic 260. The function of Peak-to-Peak circuit 260 is to derive a single output signal indicative of whether or not all the peaks satisfy the relative Peak-to-Peak spacing requirement of 67½ degrees. This signal is applied to good peak logic 238 as one of the many test signals applied to that circuit.

In the upper portion of FIG. 14 are shown the Number of Peaks and Test signal logic circuit at the left and the Direction of Peaks logic circuit at the right. The Number of Peaks and Test signal logic circuit includes 4-bit up/down counter 228, NOR gate 230, 2-to-1 multiplexer 232, reset logic 234, 4-bit up/down counter 236 and good peak logic 238. The purpose of 4-bit up/down counter 228, NOR gate 230, 2-to-1 MUX 232, and reset logic 234, is to determine whether or not the contour data point currently under evaluation should be tested for correlation data and extraction of the singularity point. Two reasons for not enabling such a test are (1) the number of correlation points having reject bits in a TRUE logic state exceeds a predetermined count and (2) the correlation data fails to satisfy the min-max threshold criterion during the first pass of the data through the peak processing portion of the invention. Signals indicative of missing correlation data are applied to up/down counter 228 the output signals of which are applied to NOR gate 230. The output signal of NOR gate 230, designated MCT for missing correlation test, is applied to reset logic 234 and to 2-to-1 MUX 232 as a select signal. The select signal, depending upon its logic state, permits the entry into 2-to-1 MUX 232 of one of two error code settings applied to the input terminals of the multiplexer. One of the code settings represents a value indicative of too many missing correlation signals as a source of error. The other code setting indicates a failure of the correlation data to satisfy the min-max threshold criterion during the first pass. Depending upon which error has occurred, the appropriate error code setting is loaded into 2-to-1 MUX 232 and made available for loading into 4-bit up/down counter 236 upon command from reset logic 234. This load command is generated in response to either the MCT signal or the min-max threshold signal applied to the input terminals of reset logic 234. Reset logic 234 also generates a Bad Point signal which signals the system to bypass direction of peaks and number of peaks information for the current contour data point if either error exists.

If neither one of the above errors occurs, the 4-bit up/down counter 236 generates a count indicative of the number of peaks established as reliable after counter 236 is reset by the Point Reset signal at the beginning of second pass of data through this portion of the invention and enabled by the Good Peak logic circuit 238. The reliability of the measurement of peaks is made possible by Good Peak logic circuit 238 which receives test signals which indicate whether or not the previously discussed tests for spacing and relative values of peaks and valleys have been met. Included in these test signals are the Valley-to-Peak test signal, the Peak-to-Valley test signal, the peak threshold test signal, the Valley-to-Valley test signal and the Peak-to-Peak test signal. Only if all of these requirements are satisfied and represented by TRUE logic signals applied to the input terminals of Good Peak logic circuit 238, is the up/down counter 236 enabled to increment in response to the occurrence of a good logic clock signal indicating that the current peak is reliable.

The output signal of 4-bit up/down counter 236, designated NOPKS, represents the number of peaks detected after the second pass of correlation data through the peaks processing portion of the invention has been completed.

The direction of peaks logic indicates the reference angle direction of the vectors corresponding to one, two or three peaks, the number of peaks being indicated by up/down counter 236. These direction data are stored in 2-to-1 MUX with memory devices 262, 264, and 266. The output signal of 2-to-1 MUX with memory 266, which is designated PKS31, at the end of the second pass of correlation data corresponds to the direction of the first occurring peak as long as at least one peak is detected. The output signal of 2-to-1 MUX with memory 264, designated PKS32, corresponds to the direction of the second occurring peak as long as at least two peaks occur. The output signal of 2-to-1 MUX with memory 262, designated PKS33, corresponds to the direction of a third occurring peak if a third valid peak has been detected.

Control of the three multiplexers with memory 262, 264 and 266 is accomplished by PKS3 control logic circuit 265 which receives input signals from 4-bit up/down counter 236 and the lowest peak test signal generated by lowest peak test circuit previously discussed in conjunction with FIG. 13. At the beginning of the second pass, and at the occurence of the first peak when 4-bit up/down counter counts to one, 2-to-1 MUX 262 and 266 are each loaded with the tentative peak pointer TP which at that time is the pointer value for that first occurring peak signal. When the next peak occurs, assuming there are two peaks, that value is clocked into both 2-to-1 MUX 262 and 264. If a third peak is detected, it is clocked into 2-to-1 MUX 262 so that at the completion of the second pass, (assuming three peaks have been detected), the first peak pointer is available at the output terminals of the 2-to-1 MUX 266, the second peak pointer is available at the output terminals of 2-to-1 MUX 264 and third peak pointer is available at the output terminals to 2-to-1 MUX 262.

If the lowest peak test circuit of FIG. 13 indicates that the lowest peak value of three detected peaks does not satisfy the threshold criterion, which in a preferred embodiment is a value of greater than 62, only the output signals of 2-to-1 MUX 264 and 266 are acknowledged and their contents, corresponding to the pointers of two peaks, are made available to the remainder of the classifier system. If it is determined that the first detected peak is the lowest of the three and less than the value 62, the contents of 2-to-1 MUX 262 are loaded into 2-to-1 MUX 266 so that the third occurring peak is available at the output terminals of 2-to-1 MUX 266 and the second peak is available at the output terminals of 2-to-1 MUX 264. On the other hand, if it is the second occurring peak of three peaks that has a value below 62, the contents of 2-to-1 MUX 262 are loaded into 2-to-1 MUX 264 and the first occurring peak is available at the output terminals of 2-to-1 MUX 266 and the third occurring peak is available at the output terminals of 2-to-1 MUX 264. Clearly, if it is the third occurring peak that fails the lowest peak test, the contents of MUX 264 and MUX 266 are retained. In any case, the number of peaks counter 236 is counted down to indicate that only two peaks have been detected.

As a result of the two passes of correlation data through the peak processing portion of the invention, the resultant output includes the No Peaks signal NOPKS, indicative of the number of peaks detected at the corresponding contour data point and the direction of peaks signals PKS3 corresponding to the reference angle pointer direction for each of the peaks detected.

SUMMARY

It will now be understood that what has been described herein is a method and apparatus for smoothing ridge contour data and for reliable extraction of singularity points of a fingerprint image for fingerprint classification. A specific embodiment described is a multichip TTL logic device that accepts epidermal ridge contour data of a fingerprint image and generates therefrom smooth contour data that includes a multi-element vector field indicating the location and orientation of fingerprint singularities. Of course, it will be understood that the invention is not limited to the particular embodiment described and that the invention could be implemented in other forms of logic, including other types of hardware and software to accomplish the operations described herein. However, all such alternative embodiments are contemplated within the scope of the invention.

The invention has been described in sufficient detail to enable one skilled in the art to make and use the invention. For purposes of brevity and to avoid inadvertent obfuscation of the important elements of the invention, certain trivial aspects have not been described in specific detail. By way of example, the specific time relationships of clock signals have not been specifically delineated. However, these aspects of the invention will now be readily apparent to those having skill in the applicable arts from applicants' teaching in view of the teaching of the prior art.

The invention described herein may be employed in many ways different from that specifically set forth and many variations may be made therein within the scope of the appended claims.

We claim:

1. In an automatic data processing system for classifying contour patterns into preselected classifications, the machine method comprising the steps of
   (1) Determining the peaks and valleys in correlation of ridge contour data elements with plurality of reference angle vectors,
   (2) Testing said peaks and valleys against a plurality of threshold criteria to ascertain which of said peaks are of interest, and
   (3) Identifying the number of peaks of interest and the corresponding reference angle vector associated with each identified peak,
   whereby singularity detection, and classification of an image are enhanced.

2. In an automatic system for processing fingerprint patterns which are each characterized by epidermal ridge lines forming a contour pattern classifiable into one of a predetermined number of classification types, the automatic system including means for scanning a fingerprint, means for accepting identifying information corresponding to said scanned fingerprint, means for automatically extracting ridge contour data that may be represented by a matrix of ridge contour data elements from said scanned fingerprint corresponding to said contour pattern, means responsive to said ridge contour data for automatically classifying said contour pattern into one of said classification types and means for automatically storing said identifying information according to said corresponding classification type;
   an improved method for automatically classifying fingerprints comprising the steps of:
   (1) scanning said ridge contour data,
   (2) generating correlation data on a one-for-one basis for each said contour data element, said correlation data being indicative of the relative correlation of the average contour ridge flow in the vicinity of each said element and a plurality of reference angle vectors,
   (3) processing said correlation data to identify peaks and valleys of correlation data, and
   (4) testing in accordance with a set of reliability criteria the relative values of the peaks and valleys of correlation data, the spacing between peaks of correlation data and the spacing between valleys of correlation data for identifying the number of peaks of correlation data and the reference angle vector to which each such peak corresponds.

3. The method as defined in claim 2 wherein said processing step comprises the steps of:
   ascertaining the maximum correlation value corresponding to each said contour data element,
   ascertaining the minimum correlation value corresponding to each said contour data element,
   ascertaining the difference between the maximum and the minimum correlation values that correspond to each said contour data element; and wherein said testing step comprises the steps of:
   comparing said difference with a predetermined threshold value, and terminating and restarting said processing step if said difference is not greater than said threshold value.

4. The method as defined in claim 2 wherein said processing step comprises the steps of:
   ascertaining the value of each correlation peak corresponding to said contour data element; and wherein said testing step comprises the steps of:
   comparing said correlation peak value with a predetermined threshold value, and
   identifying each said correlation peak value as a good peak only if said peak value is greater than said threshold value.

5. The method as defined in claim 2 wherein said processing step comprises the steps of:
   ascertaining the value of each correlation peak corresponding to each said contour data element,
   ascertaining the value of each correlation valley corresponding to each said contour data element, and
   ascertaining the difference between each said peak value and each said valley value that correspond to each said contour data element; and wherein said testing step comprises the steps of:
   comparing said difference with a predetermined threshold value, and identifying each said correlation peak as a good peak only if said difference is greater than said threshold value.

6. The method as defined in claim 2 wherein said processing step comprises the steps of:
   ascertaining the reference angle vector of each correlation peak corresponding to each said contour data element, and
   determining the angular spacing between each pair of reference angle vectors corresponding to respective peaks;
   and wherein said testing step comprises the steps of:
   comparing said spacing with the predetermined threshold spacing, and
   identifying each correlation peak as a good peak only if said spacing is greater than said threshold spacing.

7. The method as defined in claim 2 wherein said processing step comprises the steps of:
   ascertaining the reference angle vector of each correlation valley corresponding to each of said contour data element and
   determining the angular spacing between each pair of reference angle vectors corresponding to respective valleys;
   and wherein said testing step comprises the steps of:
   comparing said spacing with the predetermined threshold spacing, and
   identifying each said correlation peak as a good peak only if said spacing is greater than said threshold spacing.

8. The method as defined in claim 2 wherein said processing step comprises the steps of:
   ascertaining the value of the lowest correlation peak corresponding to each said contour data element; and wherein said testing step comprises the steps of:
   comparing said value of said lowest peak with a predetermined threshold value, and
   identifying said lowest peak as a good peak only if said lowest peak value is greater than said threshold value.

9. In an automatic fingerprint pattern processing system responsive to extracted ridge contour data for classifying fingerprint patterns into preselected classification types, the apparatus comprising:
   means for determining the peaks and valleys in correlation of ridge contour data elements with a plurality of reference angle vectors,
   means for testing said peaks and valleys against a plurality of threshold criteria to ascertain which of said peaks are of interest, and means for identifying the number of peaks of interest and the corresponding reference angle vector associated with each identified peak, whereby singularity detection and classification of a fingerprint image are enhanced.

10. In an automatic system for processing fingerprint patterns which are each characterized by epidermal ridge lines forming a contour pattern classifiable into one of a predetermined number of classification types, the automatic system including means for scanning a fingerprint, means for accepting identifying information corresponding to said scanned fingerprint, means for automatically extracting ridge contour data that may be represented by a matrix of ridge contour data elements from said scanned fingerprint corresponding to said contour pattern, means responsive to said ridge contour data for automatically classifying said contour pattern into one of said classification types and means for automatically storing said identifying information according to said corresponding classification type;

the improvement wherein said automatic classifying means comprises:

(1) means for scanning said ridge contour data, (2) means for generating correlation data on a one-for-one basis for each said contour data element, said correlation data being indicative of the relative correlation of the average contour ridge flow in the vicinity of each said element with a plurality of reference angle vectors, (3) means for processing said correlation data for identifying peaks and valleys of correlation data, and (4) means for testing in accordance with a set of reliability criteria the relative values of peaks and valleys of correlation data, for testing the spacing between peaks of correlation data and for testing the spacing between valleys of correlation data for identifying the number of peaks of correlation data and the reference angle vector to which each such peak corresponds.

11. The improvement as defined in claim 10, wherein said means for processing comprises:

means for ascertaining the maximum correlation value corresponding to each said contour data element, means for ascertaining the minimum correlation value corresponding to each said contour data element, means for ascertaining the difference between the maximum and minimum correlation values that correspond to each said contour data element; and wherein said means for testing comprises:

means for comparing said difference with a predetermined threshold value, and means for resetting said means for processing if said difference is not greater than said threshold value.

12. The improvement as defined in claim 10, wherein said means for processing comprises:

means for ascertaining the value of each correlation peak corresponding to each said contour data element; and wherein said means for testing comprises:

means for comparing each said correlation peak value with a predetermined threshold value, and means for identifying each said correlation peak value as a good peak only if said peak value is greater than said threshold value.

13. The improvement as defined in claim 10 wherein said means for processing comprises:

means for ascertaining the value of each correlation peak corresponding to each said contour data element, means for ascertaining the value of each correlation valley corresponding to each said contour data element, and means for ascertaining the difference between each said peak value and each said valley value that correspond to each said contour data element; and wherein said means for testing comprises:

means for comparing said difference with a predetermined threshold-value, and means for identifying each said correlation peak as a good peak only if said difference is greater than said threshold value.

14. The improvement as defined in claim 10 wherein said means for processing comprises:

means for ascertaining the reference angle vector of each correlation peak corresponding to each said contour data element, and means for determining the angular spacing between each pair of reference angle vectors corresponding to respective peaks, and wherein said means for testing comprises:

means for comparing said spacing with a predetermined threshold spacing, and means for identifying each said correlation peak as a good peak only if said spacing is greater than said threshold spacing.

15. The improvement as defined in claim 10 wherein said means for processing comprises:

means for ascertaining the reference angle vector of each correlation valley corresponding to each said contour data element, means for ascertaining the reference angle vector of each correlation valley corresponding to each said contour data element, and means for determining the angular spacing between each pair of reference angle vectors corresponding to respective valleys;

and wherein said means for testing comprises:

means for comparing said spacing with a predetermined threshold spacing, and means for identifying each said correlation peak as a good peak only if said spacing is greater than said threshold spacing.

16. The improvement as defined in claim 10 wherein said means for processing comprises:

means for ascertaining the value of the lowest correlation peak corresponding to each said contour data element; and wherein said means for testing comprises:

means for comparing said value of said lowest peak with a predetermined threshold value, and means for identifying said lowest peak as a good peak only if said lowest peak value is greater than said threshold value.

17. In an automatic system for processing fingerprint patterns which are each characterized by ridge lines forming a contour pattern classifiable into one of a predetermined number of classification types, the automatic system including means for scanning a fingerprint, means for accepting identifying information corresponding to said scanned fingerprint, means for automatically extracting ridge contour data that may be represented by a matrix of ridge contour data elements from said scanned fingerprint corresponding to said contour pattern, means responsive to said ridge contour data for automatically classifying said contour pattern into one of said classification types and means for automatically storing said identifying information according to said corresponding classification type;

the improvement wherein said automatic classifying means comprising:

(1) means for scanning said ridge contour data, (2) means for generating correlation data on a one-for-one basis for each said contour data element, said correlation data being indicative of the relative correlation of the average contour ridge flow in the vicinity of each said element and a plurality of reference angle vectors, (3) means for identifying peaks and valleys of correlation data for each said contour data element, (4) means for ascertaining the maximum correlation value corresponding to each said contour data element, (5) means for ascertaining the minimum correlation value corresponding to each said contour data element, (6) means for ascertaining the difference between the maximum and minimum correlation values that correspond to each said contour data element.

(7) means for comparing said max-min difference with a predetermined max-min threshold value, (8) means for resetting said means for identifying if said max-min difference is not greater than said max-min threshold value, (9) means for ascertaining the value of each correlation peak corresponding to each said contour data element,

(10) means for comparing each said correlation peak value with a predetermined peak threshold value,

(11) means for identifying said correlation peak value as a good peak only if said peak value is greater than said peak threshold value,

(12) means for ascertaining the value of each correlation valley corresponding to each said contour data element,

(13) means for ascertaining the difference between each said peak value and each said valley value that correspond to each said contour data element,

(14) means for comparing said peak-valley difference with a predetermined peak-valley threshold value,

(15) means for identifying said correlation peak as a good peak only if said peak-valley difference is greater than said peak-valley threshold value,

(16) means for ascertaining the reference angle vector of each correlation peak corresponding to each contour data element,

(17) means for determining the angular spacing between each pair of reference angle vectors corresponding to respective peaks,

(18) means for comparing said peak-to-peak spacing with a predetermined peak-to-peak threshold spacing,

(19) means for identifying each correlation peak as a good peak only if said peak-to-peak spacing is greater than said peak-to-peak threshold spacing,

(20) means for ascertaining the reference angle vector of each correlation valley corresponding to each said contour data element,

(21) means for determining the angular spacing between each pair of reference angle vectors corresponding to respective valleys,

(22) means for comparing said valley-to-valley spacing with a predetermined valley-to-valley threshold spacing, and

(23) means for identifying each said correlation peak is a good peak only if said valley-to-valley spacing is greater than said valley-to-valley threshold spacing.

* * * * *